United States Patent [19]
Walmer, Sr.

[11] Patent Number: 5,138,888
[45] Date of Patent: Aug. 18, 1992

[54] PIVOTABLE AXIS TURBINE FLOWMETER

[76] Inventor: Warren L. Walmer, Sr., Crepe Myrtle Trail, Lot #82, Youngsville, La. 70592

[21] Appl. No.: 587,134

[22] Filed: Sep. 24, 1990

[51] Int. Cl.$^5$ .................................. G01F 1/12
[52] U.S. Cl. ...................... 73/861.83; 73/861.92
[58] Field of Search ............... 73/198, 861.81, 861.83, 73/861.92, 861.79

[56] References Cited

U.S. PATENT DOCUMENTS

| | | | |
|---|---|---|---|
| 3,136,159 | 6/1964 | Young | 73/861.83 |
| 4,102,189 | 7/1978 | Cohrs | 73/861.83 |
| 4,134,298 | 6/1979 | Guthrie | 73/861.92 X |

Primary Examiner—Herbert Goldstein
Attorney, Agent, or Firm—Joseph L. Lemoine, Jr.

[57] ABSTRACT

An apparatus for measuring the rates of flow of fluid through a line, which is characterized by a fluid driven turbine whose axis may be pivotably varied throughout an arc from being parallel to the direction of fluid flow to a position perpendicular to the direction of fluid flow. By varying the angle at which the fluid flow impinges on the turbine wheel the "K factor", that is the rate of turbine rotation per unit of fluid flow can be adjusted so as to adapt the flowmeter to differing fluids (such as, steam, air and other gaseous fluids, and, both low and high density liquids). Also, by varying the angle at which the fluid flow impinges on the turbine wheel the rate of turbine rotation per unit of fluid flow can be adjusted to adapt the flowmeter to a very wide range of flow rates (high rangeability).

8 Claims, 2 Drawing Sheets

PIVOTABLE AXIS TURBINE FLOWMETER

BACKGROUND OF THE INVENTION

1. Field of Invention

The invention relates to devices for measuring the rates of flow of a fluid through a line. More particularly the invention relates to use of bladed radial turbines driven by the fluid at a rate of rotation dependent on the rate of fluid flow. With more particularly the invention relates to turbine flowmeters whose rate of rotation per unit of fluid flow that is, metering characteristics) may be varied so as to accommodate fluids of differing specific gravity and viscosity, or varied to accommodate a wide range of flow velocities. With even more particularity the invention relates to turbine flowmeters whose metering characteristics ("K factor") can be adjusted externally, in situ, without replacement of any parts.

2. Description of Prior Art

In virtually every industrial field there is at least some requirement for measuring the rate, or volume, of fluid which is, or has, flowed through a line or pipe. Numerous means are used to accomplish this task, including, but not necessarily limited to differential pressure meters (such as, orifice plates, venturi tubes, flow tubes, flow nozzles, pitot tubes, elbow meters, target meters, and variable area meters), positive displacement meters (such as, reciprocating piston meters, oval-gear meters, nutating-disk meters and rotary vane meters), velocity meters (such as turbine meters, vortex meters, electromagnetic meters, and ultrasonic meters) and mass flowmeters (such as, coriolis meters, and thermal mass meters).

Turbine flowmeters have found widespread use for accurate fluid measurement applications. The meter generally consists of a multiple-bladed turbine wheel mounted within a pipe perpendicularly to the liquid flow. Fluid passing through the turbine causes it to rotate about its axis. The rotational speed of the turbine is a direct (not squared) function of flow rate and is typically sensed by magnetic pick-up, photoelectric cells or tachometer means. Flow rate totaled for a given period of time is proportional to flow volume.

One example of a turbine flowmeter is disclosed in Owen, U.S. Pat. No. 3,217,539. In said patent the axis of rotation of the turbine is substantially parallel to the fluid flow.

Another turbine flowmeter is disclosed in Dee, U.S. Pat. No. 3,427,879. In said patent the turbine also rotates about an axis which is substantially parallel to the fluid flow.

Stapler, U.S. Pat. No. 4,030,359 relates to a turbine flowmeter probe for measuring fluid flow in open streams or near the discharge of pipes. A turbine is carried within a cylinder, which cylinder can be clamped to a handle at any point within a 90° arc. The purpose of the adjustable clamping head is simply to facilitate alignment of the axis of the turbine t the direction of fluid flow.

Another variation of a turbine flowmeter is disclosed in Cohrs, U.S. Pat. No. 4,102,189. In said patent a turbine shrouded by a cylindrical sleeve is mounted on a probe. A pickoff coil senses the speed of the turbine wheel. If an overspeed condition of the turbine is sensed, the sleeve and turbine is rotated, as a unit, 90° to the direction of fluid flow, thereby preventing bearing damage.

Guthrie, U.S. Pat. No. 4,134,298 describes another probe type turbine contained within a cylindrical sleeve. The turbine wheel is normally located with its axis parallel to the direction of fluid flow, but, in the event of turbine overspeed, the turbine is rotated 90° to the direction of fluid flow to prevent bearing damage.

Amemori, et al, U.S. Pat. No. 4,242,916 discloses a turbine flowmeter for measuring fluids of differing coefficients of viscosity. In said patent the turbine axis is parallel to the direction of fluid flow. Adjustment of the flowmeter to accommodate differing fluids is accomplished by setting the distance between an upstream guide and a downstream guide so as to alter the state of fluid flow impinging on the turbine wheel.

None of the aforesaid inventions disclose an "in line" flowmeter wherein the axis of the turbine is settable throughout a range from a direction parallel to the fluid flow to a direction perpendicular to the fluid flow.

The invention disclosed herein represents a significant improvement over prior art in that the "K factor" (the number of turbine rotations per unit of flow rate or flow volume) of the disclosed flowmeter can be varied, by selecting the appropriate angle between the turbine axis and the direction of flow, to measure fluids of different viscosities and specific gravities, and provide greater rangeability than that possible with a fixed position turbine flowmeter.

OBJECTS OF THE INVENTION

The general object of this invention is to provide a new and improved means to measure flow rate and/or volume of fluid through a line.

More particularly, one object of the invention is to provide a turbine flowmeter which is suitable for measuring the flow rate and/or volume of fluids of differing viscosities and specific gravities, without having to make complicated mathematical calculations to convert meter readings to actual flow rates.

A further object of the invention is to provide a turbine flowmeter with greater rangeability than is possible with a flowmeter having a fixed position turbine.

Yet another object of the invention is to provide a turbine flowmeter which can be set to measure different fluids, with great rangeability, without having to change any internal workings of the meter, without overspeeding the turbine, and without having to make complex mathematical calculations to convert meter readings to actual flow rates.

SUMMARY OF THE INVENTION

The improved turbine flowmeter, for measuring flow rate or flow volume of fluid through a line, is characterized by a generally cylindrical housing which includes an integral upstream line connector and an integral downstream line connector, a turbine support frame which is pivotable in a plane which is perpendicular to the direction of fluid flow, a bladed turbine mounted in said turbine support frame by bearing means, a gear means and operator means for externally pivoting said turbine support frame throughout a 90° arc from the turbine axis being parallel to the direction of fluid flow to the turbine axis perpendicular to the direction of fluid flow, external means for sensing rotation of the turbine about its axis, external means for indicating the angle of the turbine axis with respect to the direction of fluid flow.

The improved turbine flowmeter is installed "in line" with the fluid rate or volume to be measured. Because it may be used to sequentially (not simultaneously) measure fluids of differing viscosities and specific gravities, the flow line may be manifolded, through valves, to several other lines carrying different fluids (such as, gas, oil, air, gasoline, waste, steam or the like); thereby enabling one improved meter to take the place of many traditional meters. Upon determination of the type of fluid to be measured, and the expected flow range to be measured, turbine/flow angle is selected by said shaft and gear means, which can be done remotely, by electronic, pneumatic or hydraulic controls if desired. Once the proper turbine/flow angle is selected according to the characteristics of the fluid to be measured, and according to the flow range to be measured, the improved turbine flowmeter is used as any ordinary turbine flowmeter. Typically an electromagnetic coil is used to sense the passage of individual turbine blades and the number of pulses per unit of time calculated, and converted to flow rate or flow volume by electronic means. Other sensing means (such as, photoelectric sensors, tachometer means and the like) are also possible. As the "correction" factor for fluids of differing characteristics and/or ranges is effected within the improved flowmeter itself, it is not necessary to change sensing/calculating means, or perform mathematical calculations to convert meter readings to actual flow rates when differing fluids, or ranges, are to be measured, one need only set the turbine/flow direction angle correctly then take readings in a typical manner.

DESCRIPTION OF THE PREFERRED EMBODIMENT

Figure 1:
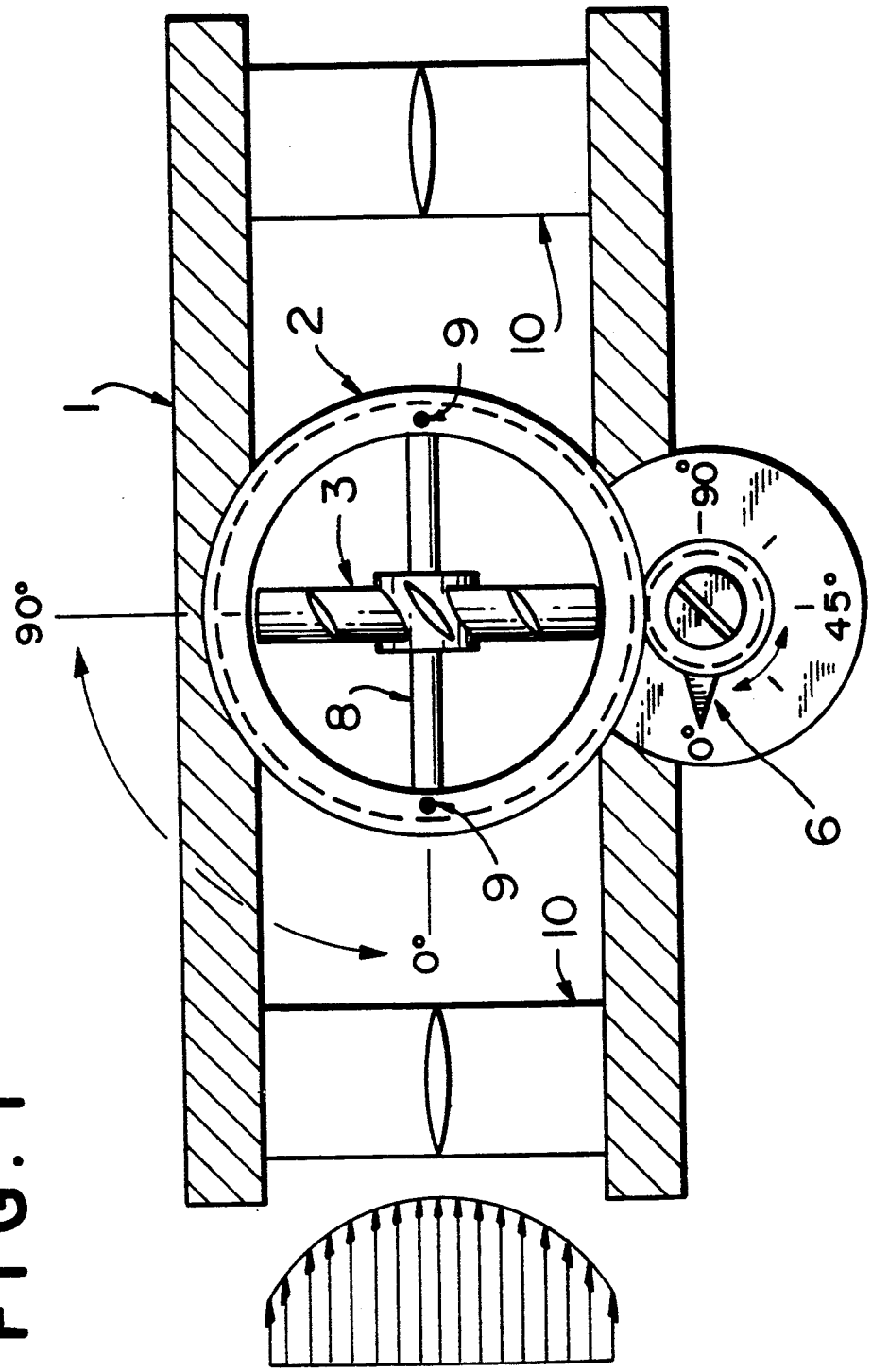
FIG. 1 is a side elevational plan view of the improved turbine flowmeter of the invention disclosed herein.
Figure 2:
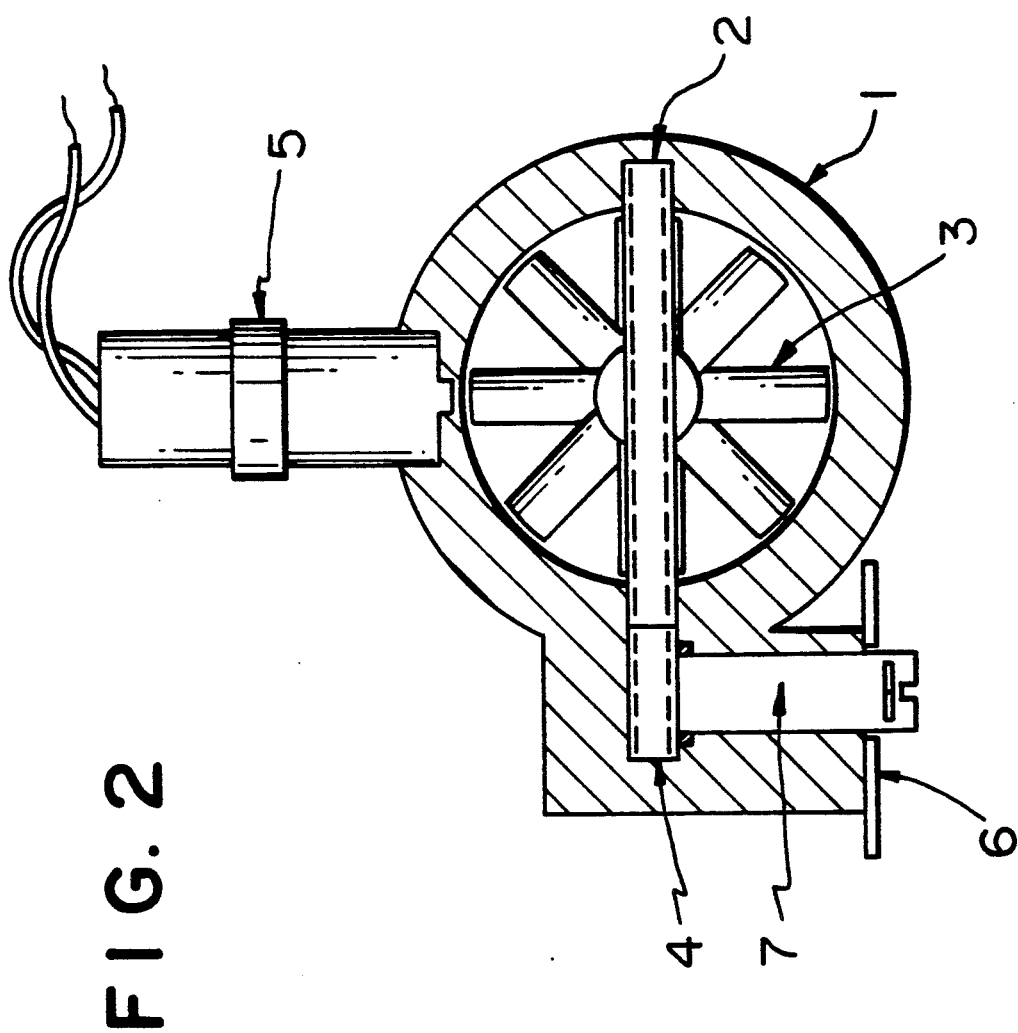
FIG. 2 is a front elevational plan view of the improved turbine flowmeter of the invention disclosed herein.

With reference to FIG. 1 and FIG. 2, the first major component of the improved turbine flowmeter is the generally cylindrical housing, 1, containing an axial bore to allow for the passage of fluid, and including an integral upstream line connector means and integral downstream line connector means, for mounting "in line" with the fluid carrying line to be measured. Axially disposed grooves, or notches, are contained within the bore of the housing, and may be lined or coated with a friction reducing materials (such as, teflon, nylon, delrin or the like), to receive the turbine support frame, 2. In the preferred embodiment the housing also has a semi-tangential borehole, and appropriately sized cavity therein, for receiving operating shaft, 7, and gear means, 4.

The next major component of the improved turbine flowmeter is the pivotable turbine support frame, 2. In the preferred embodiment of the present invention the support frame, 2, is made of rigid material and is generally circular in shape. The outer diameter of support frame, 2, is pivotably disposed within the grooves or notches of the housing, 1. The inner diameter of the support frame, 2, is only slightly larger than the diameter of the turbine wheel, 3. The support frame is equipped with bearing means, 9, for receiving turbine shaft, 8.

Turbine wheel, 3, is approximately the same size of the axial bore of housing, 1, and is centrally mounted on shaft, 8, about which the turbine wheel rotates in response to fluid flow. The angle of the turbine axis being coincident with shaft, 8, and therefore, the angle at which the fluid flow impinges on turbine wheel, 3, may be varied relative to the direction of fluid flow by pivoting support frame, 2, within the grooves of housing, 1. When the turbine axis (coincident with shaft) is parallel to the direction of fluid flow, the maximum "K factor" (number of turbine wheel revolutions, or blade pulses, per unit of flow rate or flow volume) is achieved. As the angle between the turbine axis (coincident with shaft, 8) and the direction of fluid flow increases, the "K factor" of the meter decreases. At a 90° angle the "K factor" of the meter is at or near zero. As can be seen as lower "K factors" allow measurement of fluids having a high specific gravity or higher velocity, at a given flow rate, with little chance of turbine overspeed. As less dense, or lower velocity fluids are measured, at a given flow rate, it is desirable to use a higher "K factor", which is achieved simply by reducing, possibly nearing 0°, the angle between the turbine axis and the direction of fluid flow. It is this variable "K factor" which allows the improved turbine flowmeter to be suitable for measuring the flow of various fluids, and allows it to have a much higher rangeability (the ability to measure both small and large rates of flow) than does a flowmeter with a fixed position turbine. As a practical matter it is usually desirable to use as low a "K factor" as is possible to accurately measure a given flow rate, as this avoids unnecessary wear and tear on meter components and reduces pressure drop associated with the metering process.

In the preferred embodiment the angle between the turbine axis (coincident with shaft, 8) and the direction of fluid flow is accomplished by gear means, 4, which cooperates with support frame, 2, to pivot support frame, 2, within housing, 1. In the preferred embodiment gear means, 4, is operated by shaft, 7, contained in a semi-tangential bore of housing, 1. Typically operating shaft, 7, is sealed against fluid leakage by conventional means (such as "O rings"). Mounted externally, to operating shaft, 7, is means, 6, to indicate the position of shaft, 7; hence gear means, 4; hence support frame, 2; hence turbine, 3; and hence turbine axis (coincident with shaft, 8). In the preferred embodiment said indicating means is a simple pointer and scale marked in angular degrees (jointly comprising, 6), however, many other indicating means could be used as well.

The rotation of turbine wheel, 3, about its axis (coincident with shaft, 8) is accomplished by sensing means, 5, which is adapted to housing, 1, 90° from the plane in which support frame, 2, pivots. So disposed said sensing means is always in close proximity to the rotating turbine blades regardless of the angle at which the turbine wheel, 3, is set relative to the direction of fluid flow. In the preferred embodiment said sensing means, 5, is an electromagnetic coil which generates a pulse each time a turbine blade passes in close proximity. Such pulses are typically counted, totaled and calculated per unit of time by conventional electronic means. Other sensing means such as photoelectric cells, tachometer means, and other conventional means could be used as well.

While not essential for all applications, in some applications upstream guidevanes, downstream guidevanes, or both, 10, may be desirable to induce a more laminar fluid flow as the fluid enters, and/or leaves, the measuring device.

The improved turbine flowmeter disclosed herein has a much greater rangeability than a flowmeter having a fixed position turbine. Typically, a flowmeter having a fixed position turbine has a rangeability in the order of 20 to 1 (for instance, a 2" meter ordinarily measure flows from 10 to 200 gallons per minute with reasonable accuracy). With the improved flowmeter a rangeability of 100 to 1 is typical, thus a 2" meter has a flow range of 10 to 1000 gallons per minute.

With a typical fixed position turbine flowmeter both gaseous fluids and liquids cannot be sequentially measured without changing the internal parts of the meter. With the improved flowmeter gaseous fluids and liquids can both be measured, sequentially, by merely adjusting the "K factor" of the flowmeter as disclosed above.

The improved flowmeter can also be adjusted to compensate for viscosity effects (an increase in viscosity typically has the effect of increasing the lower end of the flow range which can be accurately measured), for example, a 2" meter typically has a 10-200 gallon range with water, but only a 50-200 gallon range with 10 cp oil. With the improved flowmeter the effect of viscosity can be compensated for, thereby maintaining accurate measurement of low flow rate of high viscosity fluids. The improved flowmeter can also be used to minimize pressure losses necessitated by flow measuring devices. By using the smallest "K factor" (maximum angle between the turbine axis and the direction of flow) which is necessary to measure a particular flow rate, the smaller the pressure loss is across the turbine blades.

Various other uses and modifications of the present invention will occur to those skilled in the art. Accordingly, the foregoing description should be regarded as only illustrative of the invention, whose full scope is measured by the following claims.

What is claimed is:

1. An improved turbine flowmeter, for measuring flow rate or flow volume through a conduit, comprising:
   a) a bladed radial turbine rotatable about a central axis, which said turbine is pivotably disposed within the conduit about an axis which is mutually perpendicular to the axis of the conduit and to the central axis of the turbine,
   b) means for selecting a desired angle of the axis of the turbine relative to the axis of the conduit, wherein said angle is any angle in a range between and including 0 degrees and 90 degrees, and,
   c) means for measuring turbine rotation about its central axis.

2. An improved turbine flowmeter for measuring flow rate or flow volume through a line, comprising:
   a) generally cylindrical housing containing an axial bore for the passage of fluid therethrough, wherein said housing has upstream and downstream means for connection to a line containing a flow to be measured;
   b) a turbine support frame pivotably mounted within the housing in a plane coincident with the axis of the housing;
   c) a bladed radial turbine disposed centrally within the housing on a shaft wherein said shaft is rotatably mounted to said turbine support frame by bearing means;
   d) means for selecting a desired pivotal position of the turbine support frame wherein said pivotal position corresponds to any angle of the turbine shaft relative to the axis of the housing which is within a range from and including 0 degrees to and including 90 degrees;
   e) means for sensing rotation of the turbine about its shaft; and,
   f) external means for indicating the pivotal position of the turbine support frame relative to the axis of the housing.

3. The apparatus of claim 2, further comprising:
   g) guidevanes disposed in a plane generally parallel to the axis of said housing and disposed upstream of the turbine.

4. The apparatus of claim 3, further comprising:
   h) an array of radial guidevanes disposed downstream of the turbine in planes parallel to the axis of the housing.

5. The apparatus of claim 4, further comprising:
   an array of radial guidevanes disposed upstream of the turbine in planes parallel to the axis of the turbine.

6. The apparatus of claim 2, wherein said means for selecting a desired pivotal position of the turbine support frame comprises an operating shaft which rotates a gear which cooperates with a tooth means on the outer diameter of said turbine support frame.

7. The apparatus of claim 2, wherein the means for sensing rotation of the turbine about its shaft comprises an electromagnetic pickup coil mounted externally to the housing at or near the axis about which the turbine support frame is pivotally mounted.

8. The apparatus of claim 6, wherein the operating shaft has a pointer mounted externally thereto indicate the pivotal position of the turbine support frame.

* * * * *